United States Patent
Thubert et al.

(10) Patent No.: US 10,382,397 B2
(45) Date of Patent: Aug. 13, 2019

(54) MITIGATING NEIGHBOR DISCOVERY-BASED DENIAL OF SERVICE ATTACKS

(71) Applicant: Cisco Technology, Inc., San Jose, CA (US)

(72) Inventors: Pascal Thubert, La Colle sur Loup (FR); Eric Levy-Abegnoli, Valbonne (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/654,070

(22) Filed: Jul. 19, 2017

(65) Prior Publication Data

US 2017/0324770 A1    Nov. 9, 2017

Related U.S. Application Data

(62) Division of application No. 14/658,623, filed on Mar. 16, 2015, now Pat. No. 9,742,798.

(51) Int. Cl.
*H04L 29/06* (2006.01)
*H04L 29/12* (2006.01)
(Continued)

(52) U.S. Cl.
CPC .......... *H04L 63/0236* (2013.01); *H04L 45/74* (2013.01); *H04L 45/7453* (2013.01);
(Continued)

(58) Field of Classification Search
CPC ............. H04L 63/0236; H04L 63/1425; H04L 63/1458; H04L 61/103
See application file for complete search history.

(56) References Cited

U.S. PATENT DOCUMENTS 5,710,885 A    1/1998 Bondi
5,796,736 A    8/1998 Suzuki
(Continued)

FOREIGN PATENT DOCUMENTS

CN    101888338 A    11/2010
CN    103002071 A    3/2013
(Continued)

OTHER PUBLICATIONS

Gaeil An et al.: "Effective Control of Abnormal Neighbor Discovery Congestion on IPv6 Local Area Network," Jan. 1, 2006, Ubiquitous Intelligence and Computing: Third International Conference, UIC 2006, Wuhan, China, Sep. 3-6, 2006, Proceedings [Lecture Notes in Computer Science, 4159], Springer, Berlin, DE, pp. 966-976.
(Continued)

*Primary Examiner* — Dao Q Ho
(74) *Attorney, Agent, or Firm* — Behmke Innovation Group LLC; James Behmke; Stephen D. LeBarron

(57) ABSTRACT

In one embodiment, a device in a network determines whether a destination address of a packet received by the device is within a neighbor discovery (ND) cache of the device. The device determines whether the destination address is not in a set of addresses used to generate an address lookup array or possibly in the set of addresses used to generate the address lookup array, in response to determining that the destination address of the packet is not within the ND cache. The device performs address resolution for the destination address of the packet, in response to determining that the destination address of the packet is possibly in the set of addresses used to generate the address lookup array.

3 Claims, 11 Drawing Sheets

(51) Int. Cl.
*H04L 12/743* (2013.01)
*H04L 12/741* (2013.01)

(52) U.S. Cl.
CPC ........ *H04L 61/103* (2013.01); *H04L 61/6059* (2013.01); *H04L 63/1425* (2013.01); *H04L 63/1458* (2013.01)

(56) References Cited

U.S. PATENT DOCUMENTS

| | | | |
|---|---|---|---|
| 7,328,009 | B2 | 2/2008 | Takeda et al. |
| 7,339,928 | B2 | 3/2008 | Choyi et al. |
| 7,492,738 | B2 | 2/2009 | Omae et al. |
| 7,518,987 | B2 | 4/2009 | Biswas et al. |
| 7,656,840 | B2 | 2/2010 | Krishnamurthi et al. |
| 7,660,287 | B2 | 2/2010 | Axelsson et al. |
| 7,664,878 | B2 | 2/2010 | Takahashi et al. |
| 7,774,004 | B2 | 8/2010 | Inoue et al. |
| 7,805,605 | B2 | 9/2010 | Takeda et al. |
| 7,836,154 | B2 | 11/2010 | Matsuhira |
| 7,873,036 | B2 | 1/2011 | Sreemanthula et al. |
| 7,885,231 | B2 | 2/2011 | Kim et al. |
| 7,925,027 | B2 | 4/2011 | Kempf et al. |
| 8,161,549 | B2 | 4/2012 | Lahti et al. |
| 8,312,541 | B2 | 11/2012 | Levy-Abegnoli et al. |
| 8,335,505 | B2 | 12/2012 | Han et al. |
| 8,352,618 | B2 | 1/2013 | Perez |
| 8,488,557 | B2 | 7/2013 | Liu et al. |
| 8,869,278 | B2 | 10/2014 | Lahti et al. |
| 2004/0063402 | A1* | 4/2004 | Takeda ................ H04W 8/12 455/41.1 |
| 2004/0165551 | A1 | 8/2004 | Krishnamurthi et al. |
| 2004/0205211 | A1 | 10/2004 | Takeda et al. |
| 2004/0205235 | A1 | 10/2004 | Matsuhira |
| 2004/0225750 | A1 | 11/2004 | Lim et al. |
| 2004/0258008 | A1 | 12/2004 | Inoue et al. |
| 2005/0169220 | A1 | 8/2005 | Sreemanthula et al. |
| 2005/0249214 | A1* | 11/2005 | Peng .................. H04L 63/1458 709/224 |
| 2006/0112176 | A1 | 5/2006 | Liu et al. |
| 2006/0184663 | A1 | 8/2006 | Takahashi et al. |
| 2006/0248230 | A1 | 11/2006 | Kempf et al. |
| 2007/0019540 | A1 | 1/2007 | Biswas et al. |
| 2007/0091828 | A1* | 4/2007 | Ashwood-Smith .................... H04L 29/12783 370/256 |
| 2007/0099649 | A1 | 5/2007 | Han et al. |
| 2007/0130427 | A1 | 6/2007 | Lahti et al. |
| 2007/0274232 | A1 | 11/2007 | Axelsson et al. |
| 2008/0137580 | A1 | 6/2008 | Axelsson et al. |
| 2008/0170567 | A1 | 7/2008 | Joo |
| 2008/0253382 | A1 | 10/2008 | Bachmann et al. |
| 2009/0024758 | A1 | 1/2009 | Levy-Abegnoli et al. |
| 2010/0232306 | A1 | 9/2010 | Jeon et al. |
| 2010/0316019 | A1 | 12/2010 | Liu et al. |
| 2011/0161665 | A1 | 6/2011 | Perez |
| 2011/0320630 | A1 | 12/2011 | Mogul et al. |
| 2012/0180130 | A1 | 7/2012 | Lahti et al. |
| 2012/0188944 | A1 | 7/2012 | Bachmann et al. |
| 2012/0209996 | A1 | 8/2012 | Kitamura |
| 2012/0331542 | A1 | 12/2012 | Halpern |
| 2013/0083347 | A1 | 4/2013 | Perez et al. |
| 2013/0291117 | A1 | 10/2013 | Thubert et al. |
| 2014/0101760 | A1 | 4/2014 | Chen |

FOREIGN PATENT DOCUMENTS

| | | |
|---|---|---|
| CN | 103609089 A | 2/2014 |
| CN | 104081749 A | 10/2014 |
| WO | 2008/151673 A1 | 12/2008 |

OTHER PUBLICATIONS

Mutaf, P. et al.: "Compact neighbor discovery (a bandwidth defense through bandwidth optimization)," INFOCOM 2005, 24th Annual Joint Conference of the IEEE Computer and Communications Societies, Proceedings IEEE Miami, FL, USA, Mar. 13-17, 2005, Piscataway, NJ, USA, IEEE, Piscataway, NJ, USA, vol. 4, Mar. 13, 2005, pp. 2711-2719.
Partial European Search Report dated Jul. 20, 2016 in connection with European Application No. EP 16 15 6779.
European Search Report dated Nov. 16, 2016 in connection with European Application No. 16156779.
Bloom filter; http://en.wikepedia.org/wiki/Bloom_filter; pp. 1-18.
Narten et al., "Neighbor Discovery for IP Version 6 (IPv6)", Network Working Group; Sep. 2007; pp. 1-97.
Office Action dated Sep. 28, 2018 in connection with Chinese Application No. 201610143642.6.

* cited by examiner

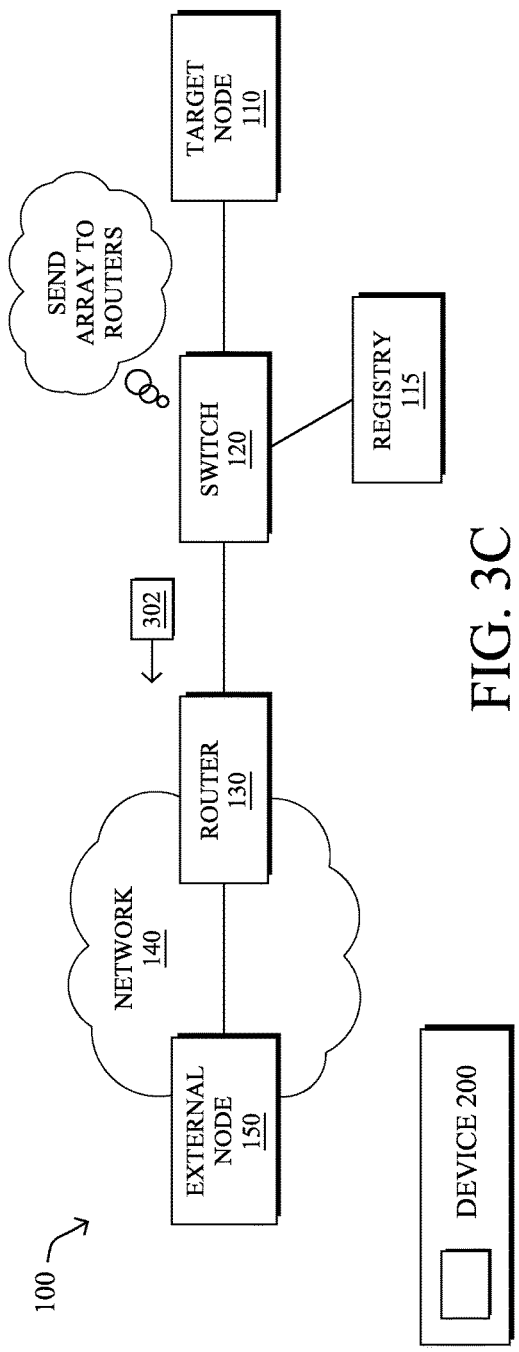
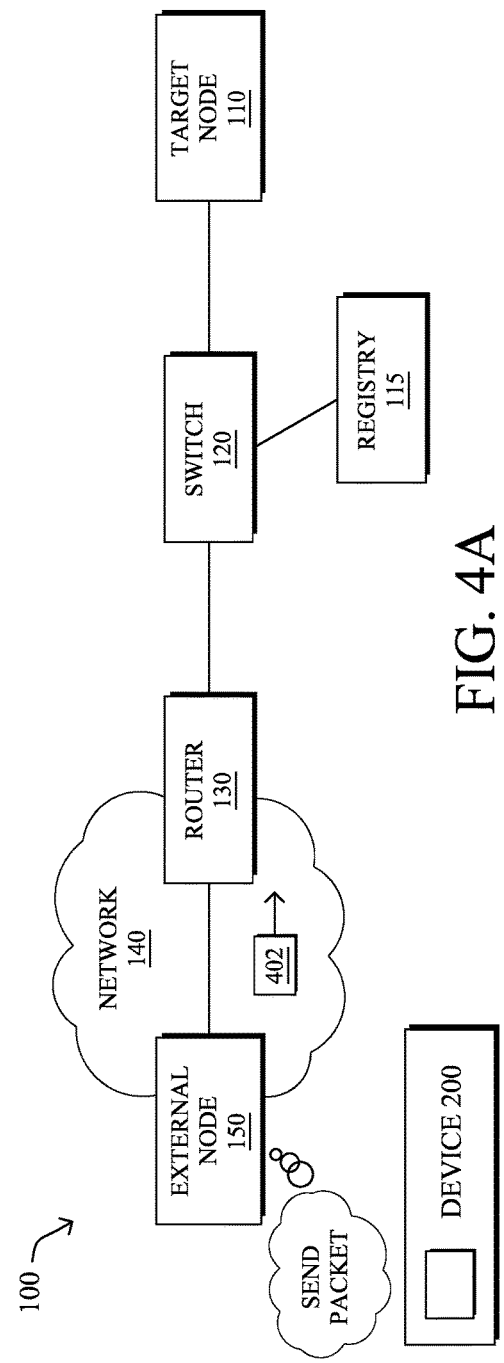

MITIGATING NEIGHBOR DISCOVERY-BASED DENIAL OF SERVICE ATTACKS

RELATED APPLICATION

This application is a Divisional application of U.S. patent application Ser. No. 14/658,623, filed on Mar. 16, 2015, the entire content of which is incorporated herein.

TECHNICAL FIELD

The present disclosure relates generally to computer networks, and, more particularly, to mitigating neighbor discovery-based denial of service attacks.

BACKGROUND

One type of denial of service (DoS) attack in a network involves an attacker flooding packets to a router that are addressed to a large number of Internet Protocol version 6 (IPv6) addresses derived from the same subnet (e.g., the /64 subnet). IPv6 neighbor discovery (ND), as outlined in the Internet Engineering Task Force (IETF) request for comments (RFC) 4861, states that the router should create an ND cache entry for each of the requested addresses and keep the entries for some time (e.g., multiple seconds). In addition, IPv6 ND also requires that the router multicast neighbor solicitation (NS) messages for each of the addresses that were not originally in the ND cache of the router. Thus, during an ND-based DoS attack, the ND cache of the router may become saturated with packets that have fake addresses and the attack traffic may maliciously consume the resources of the router that would otherwise be used by legitimate traffic. In addition, since a multicast NS message is typically broadcast by all of the wireless access points in a wireless network at the lowest speed possible, the attack may overload the available bandwidth across the fabric of the network.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 3A-3C illustrate an example of an address lookup array being generated;
FIGS. 4A-4F illustrate an example of a device processing a received packet.

DESCRIPTION OF EXAMPLE EMBODIMENTS

Overview

According to one or more embodiments of the disclosure, a device in a network determines whether a destination address of a packet received by the device is within a neighbor discovery (ND) cache of the device. The device determines whether the destination address is not in a set of addresses used to generate an address lookup array or possibly in the set of addresses used to generate the address lookup array, in response to determining that the destination address of the packet is not within the ND cache. The device performs address resolution for the destination address of the packet, in response to determining that the destination address of the packet is possibly in the set of addresses used to generate the address lookup array.

In further embodiments, a first device in a network adds an address to a binding table of the first device. The first device generates an address lookup array based in part on the address added to the binding table. The first device provides the address lookup array to a second device in the network. The second device is operable to use the address lookup array to determine whether a destination address of a packet received by the second device was not used to generate the address lookup array or was possibly used to generate the address lookup array.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

Figure 1:
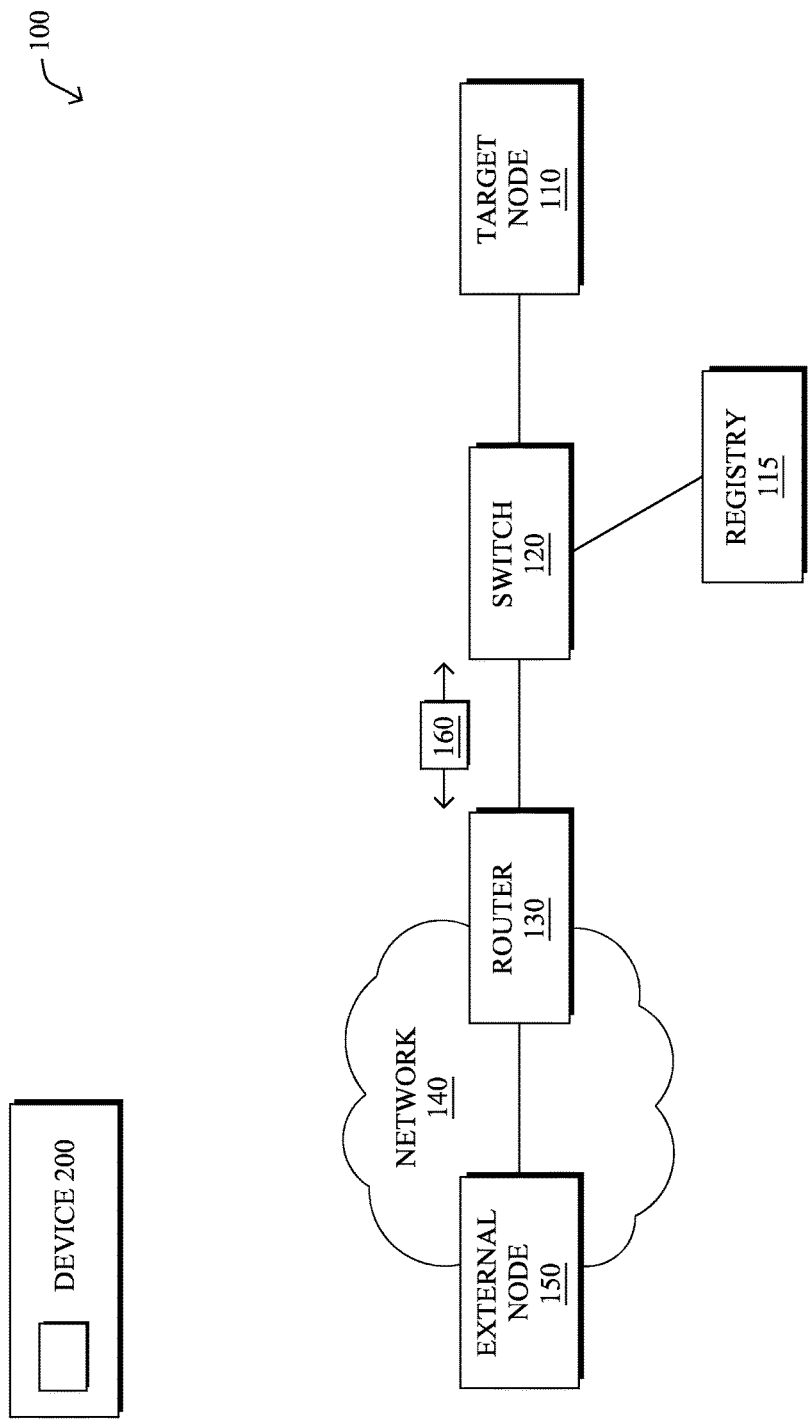
FIG. 1 illustrates an example communication network.

FIG. 1 is a schematic block diagram of an example computer network 100 illustratively comprising nodes/devices 200 such as one or more client devices (e.g., target node 110) interconnected via a switch 120 to a router 130 of a network 140 (e.g., a WAN, etc.). Note that in certain embodiments, a registry device 115 may also be interconnected with the switch 120, as described herein. In addition, an external node 150 may be located outside of the target node's local network (e.g., between router 130 and target node 110). The links between devices may be wired links or shared media (e.g., wireless links, PLC links, etc.) where certain nodes 200 may be in communication with other nodes 200 (e.g., based on physical connection configuration) current operational status, distance, signal strength location, etc. Those skilled in the art will understand that any number of nodes, devices, links, etc. may be used in the computer network, and that the view shown herein is for simplicity.

Data packets 160 (e.g., traffic and/or messages sent between the devices/nodes) may be exchanged among the nodes/devices of the computer network 100 using predefined network communication protocols such as certain known wired protocols, wireless protocols, or other shared-media protocols where appropriate. In this context, a protocol consists of a set of rules defining how the nodes interact with each other.

Figure 2:
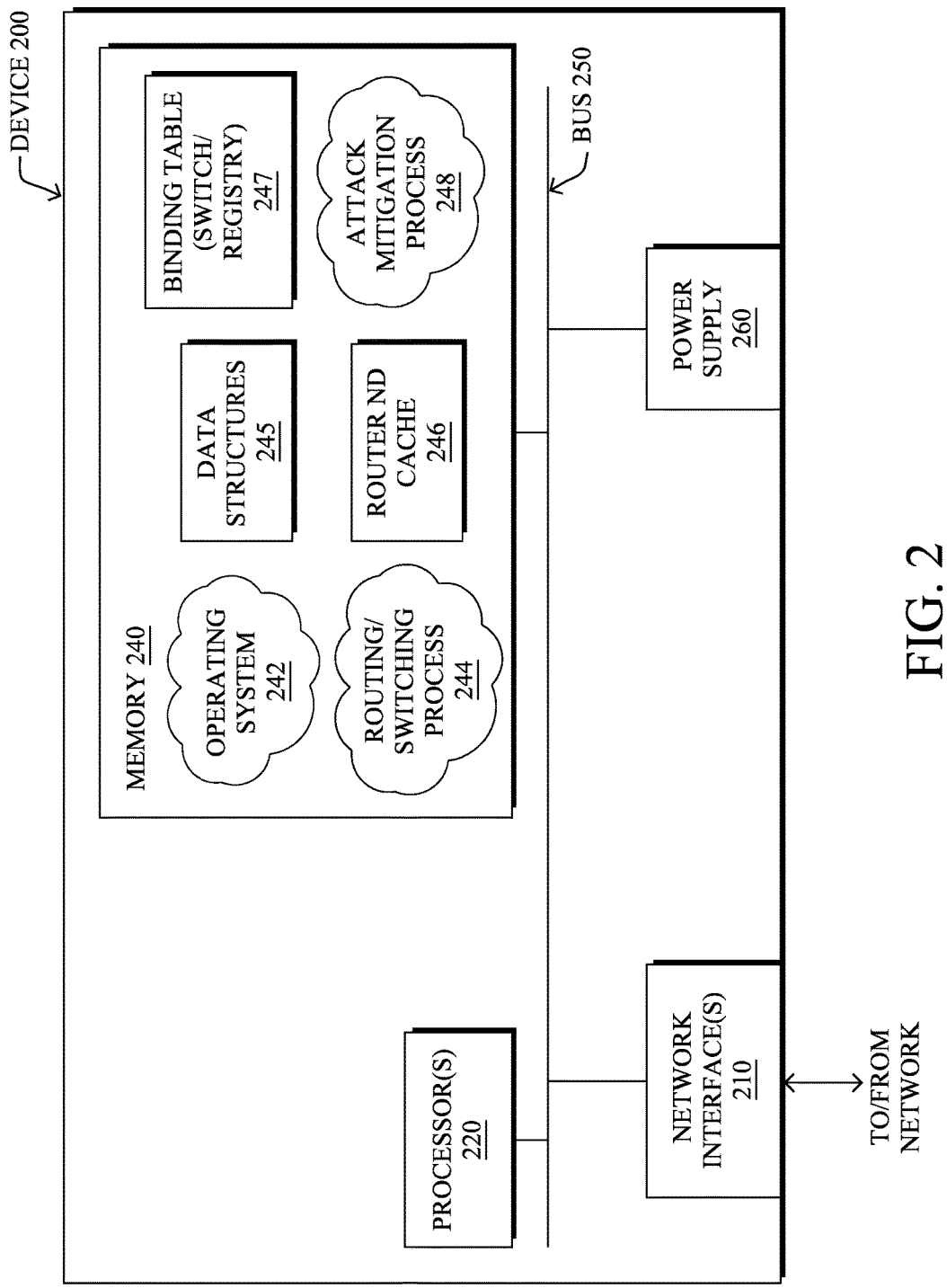
FIG. 2 illustrates an example network device/node.

FIG. 2 is a schematic block diagram of an example node/device 200 that may be used with one or more embodiments described herein, e.g., as any of the devices shown in FIG. 1 above, particularly router 130, switch 120, and/or registry device 115, as described below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise necessary elements or logic adapted to execute the software programs and manipulate the data structures 245, such as a router neighbor discovery (ND) cache 246 (on a router 130) or a binding table/registry 247 (on a switch 120 or registry 115, respectively). An operating system 242, portions of which are typically resident in memory 240 and executed by the processor, functionally organizes the device by, inter alia, invoking operations in support of software processes and/or services executing on the device. These software processes and/or services may comprise an illustrative routing/switching process 244 (e.g., for a router or switch, respectively), as well as an illustrative attack mitigation process 248. Note that while the processes are shown in centralized memory 240, alternative embodiments provide for one or more of the processes to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As would be appreciated, device 200 may be configured to use any of a set of different switching methodologies when a packet (e.g., packet 160) is received via interface(s) 210. For example, process 244 may be operable to use process switching, fast switching, express forwarding, or any other switching path/methodology. In process switching, device 200 may strip off the Layer 2 (L2) information from the received packet, copy the stripped packet to the memory of processor 220 to perform a Layer 3 (L3) lookup, and, based on the lookup, rewrite and send the packet with the new L2 destination address via interface(s) 210. In fast switching, device 200 may process the first packet of a flow in a manner similar to that during process switching, but also populate a fast-switching cache that may be used for subsequent packets destined for the same address. In express forwarding, such as with Cisco Express Forwarding by Cisco Systems™, device 200 may strip off the L2 information from the incoming packet, make a forwarding decision based on a forwarding information base (FIB) table, use the forwarding decision to select an adjacency in an adjacency table, and add the L2 information from this table to the outgoing packet. In other words, in express forwarding, device 200 may store adjacency information in a separate one of data structures 245 than that of the FIB (e.g., by using a trie that points to adjacency table entries).

As noted above, switches are required to be more and more IPv6 aware, to protect the network against rogue or uncontrolled behaviors, particularly in secure environments. For instance, IPv6 (Internet Protocol version 6) "first hop security" is a switch feature that protects the L2 network against misuse of IPv6 protocols such as the neighbor discovery protocol (NDP) and the dynamic host configuration protocol (DHCP).

In particular, there are a growing number of large-scale IPv6 deployments at enterprise, university, and government networks. For the success of each of these networks, it is important that the IPv6 deployments are secure and are of a service quality that equals that of the existing IPv4 infrastructure. Network users generally have an expectation that there is functional parity between IPv4 and IPv6 and that on each of these protocols security and serviceability concerns are similar. From the network operator perspective there is a similar assumption that both IPv4 and IPv6 are secure environments with a high degree of traceability and quality assurance.

In comparison with IPv4, IPv6 has an increased set of capabilities to simplify end-system auto-configuration while at the same time running service detection by means of Internet Control Message Protocol Version 6 (ICMPv6). One of the new functionalities within ICMPv6 is the Neighbor Discovery Protocol (NDP), which operates above ICMPv6. NDP makes heavy usage of multicast packets for on-the-wire efficiency. The functional applications of NDP include:

Router discovery;
Auto-configuration of addresses, e.g., stateless address auto-configuration (SLAAC)
IPv6 address resolution, e.g., replacing Address Resolution Protocol (ARP) (note that the acronym ARP herein may simply refer to both IPv6 address resolution and the Address Resolution Protocol);
Neighbor reachability, e.g., neighbor unreachability detection (NUD);
Duplicate address detection (DAD); and
Redirection;
The Secure Neighbor Discovery (SeND) (RFC 3971) is a protocol that enhances NDP with three additional capabilities:
Address ownership proof, which makes stealing IPv6 addresses "impossible," is used in router discovery, DAD, and address resolution, and is based upon Cryptographically Generated Addresses (CGAs). Alternatively, it also provides non-CGAs with certificates.
Message protection, which includes message integrity protection, replay protection, and request/response correlation, and is used in all NDP messages.
Router authorization, which authorizes routers to act as default gateways, and specifies prefixes that routers are authorized to announce "on-link."
While SeND provides a significant uplift to the IPv6 neighbor discovery technology by introducing the above enhancements, it does not, for example, provide any end-to-end security and provides no confidentiality.

The Source Address Validation Improvements (SAVI) Working Group at the Internet Engineering Task Force (IETF) has been studying implementations for first hop security. The following references, which are drafts available from the IETF and are each incorporated by reference in their entirety herein, are examples of current SAVI protocols:

"SAVI Solution for DHCP" <draft-ietf-savi-dhcp-11>, by J. Bi et al. (Dec. 28, 2011 edition);

"FCFS SAVI: First-Come First-Serve Source-Address Validation for Locally Assigned IPv6 Addresses" <draft-ietf-savi-fcfs> by Erik Nordmark et al. (Nov. 22, 2011 edition);

"Source Address Validation Improvement Framework" <draft-ietf-savi-framework> by Jianping Wu, et al. (Dec. 27, 2011 edition);

"SAVI for Mixed Address Assignment Methods Scenario" <draft-ietf-savi-mix> by Jun Bi et al. (Oct. 26, 2011 edition);

"SEND-based Source-Address Validation Implementation" <draft-ietf-savi-send> by Marcelo Bagnulo, et al. (Oct. 4, 2011 edition); and "SAVI Threat Scope" <draft-ietf-savi-threat-scope> by Danny McPherson, et al. (Apr. 11, 2011 edition).

Note in addition that the following Request for Comment (RFC) documents relating to IPv6 are also incorporated by reference in their entirety:

RFC 4861, "Neighbor Discovery for IP version 6 (IPv6)" by T. Narten, et al. (September 2007 edition, obsoleting RFCs 2461 and 1970); and RFC 4862, "IPv6 Stateless Address Autoconfiguration" by S. Thomson, et al. (September 2007 edition, obsoleting RFCs 2462 and 1971).

Threats are very much tied to the topology of a network infrastructure, and IPv6 brings in specific changes from a topology perspective:

More end nodes allowed on the link (up to 264);
Bigger neighbor cache on end nodes;
Bigger neighbor cache on default router;
These create more opportunities for denial-of-service (DoS) attacks;

In addition to the topological aspects there are threats closely related to the protocols in use:

NDP integrates all link operations in charge of determining address assignment, router discovery, and associated tasks like redirect.

Dynamic Host Configuration Protocol (DHCP) has a smaller role in address assignment compared to IPv4.

Non-centralized address assignment creates true challenges for controlling address misuse.

Referring again to FIG. 1, consider the case in which external node 150 launches a neighbor discovery (ND)-based denial of service (DoS) attack against router 130. For example, external node 150 and/or any number of other attackers (e.g., as part of a distributed DoS attack) may send data packets 160 to a large number of IPv6 addresses that are derived from the same subnet (e.g., the entire /64 prefix). In such a case, NDP requires that receiving router 130 create an entry in its ND cache 246 for each of these scanned addresses, and keep the entries for multiple seconds, which can result in a memory depletion and limit the capability of router 130 to serve existing hosts in the subnet (e.g., node 110). This attack is a big concern in IPv6 (and exists in IPv4 as well) because of the size of the subnet (allowing the attacker to create more state in router 130) and because router 130 is expected to store packets that triggered an address resolution.

If router 130 receives a packet 160 that identifies a destination address that is not within the ND cache of router 130, router 130 may "punt" the packet to the next fastest switching path. For example, if there is an ND cache miss in the fast switching path for the address in the packet, router 130 may punt the packet to a slower switching path, create an entry for the indicated address in its ND cache, and send a multicast NS message into the network. In the context of an ND-based DoS attack, these multicast NS messages may unnecessarily consume network resources.

Of note is that a legitimate packet may not include an address that is in the ND cache of the router. Thus, a failed ND cache hit may or may not indicate that an ND-based DoS attack is occurring. In one implementation, the router may throttle the punting of packets that fail the ND cache lookup. In doing so, the router may limit the rate at which ND cache entries are created and/or NS messages are sent into the network, thereby mitigating the effects of an ND-based DoS attack (e.g., by reducing the effects of the attack on memory, timers, etc.). However, such a mechanism also results in legitimate packets being throttled with any attack packets.

In some cases, a router may use a mechanism to protect against creating ND cache entries that would otherwise result from an ND-based DoS attack. For example, the IPv6 Destination Guard feature by Cisco Systems™ is operable to prevent the creation of malicious ND cache entries. However, such a mechanism still operates by throttling the punting of packets, eventually missing legitimate packets in the middle of an attack. Further, Destination Guard and similar ND cache protection mechanisms do not have knowledge of all the addresses of all the devices in the subnet. Thus, the only thing that the mechanism may do when executed by a router (e.g., router 130) is check whether: 1.) a DHCP server (e.g., registry 115) knows the address as being attributed to a node or 2.) a SAVI switch (e.g., switch 120) has seen that address being used as source or exposed in an on link protocol. This may be done, for example, via messages such as a LEASE QUERY, which creates additional flows that must be throttled as well, and present only limited protection. In particular, as noted above, most of the packets for destinations that are not known in the ND cache will be dropped together with the attack packets.

According to one or more embodiments of the disclosure, the techniques herein provide protection against DoS attacks targeting the ARP/ND cache of a router. In particular, implementations herein provide for the use of high recall address lookup mechanisms in the forwarding plane (e.g., the hardware or software fast path, the express forwarding path, etc.), to cancel most of an IPv6 ND-based DoS attack before the malicious packets even reach the slow forwarding path processor that handles punted packets. For example, in one embodiment, the network devices may construct and use Bloom filters to represent the IPv6 addresses that are present in the subnet. In some aspects, updates to the address lookup arrays, which may be smaller than the address itself, may be computed and sent to the router requiring protection against DoS attacks. The size of such filters may also be changed dynamically to adapt to the violence of an attack and maintain a limited throughput of false positives that can be handled accordingly, so as to avoid blindly throttling packets that may or may not be legitimate.

Specifically, according to various embodiments herein, a device in a network determines whether a destination address of a packet received by the device is within a neighbor discovery (ND) cache of the device. The device determines whether the destination address is not in a set of addresses used to generate an address lookup array or possibly in the set of addresses used to generate the address lookup array, in response to determining that the destination address of the packet is not within the ND cache. The device performs address resolution for the destination address of the packet, in response to determining that the destination address of the packet is possibly in the set of addresses used to generate the address lookup array.

Illustratively, the techniques described herein may be performed by hardware, software, and/or firmware, such as in accordance with the illustrative attack mitigation process 248, which may each include computer executable instructions executed by the processor 220 to perform functions relating to the techniques described herein, e.g., in conjunction with routing/switching process 244. For example, the techniques herein may be treated as extensions to conventional first hop security protocols, and as such, may be processed by similar components understood in the art that execute those protocols on the specific device (e.g., router 140, switch 120, or even registrar 115) performing the action being described, accordingly.

Operationally, a high recall address lookup array (e.g., a Bloom filter, etc.) may be pushed to the forwarding plane or the fast path, so that the forwarding plane can use this information to dramatically throttle an ND-based DoS attack while preserving legitimate traffic. In general, recall quantifies the ability of a mechanism to retrieve relevant information from a data set. One example of such a mechanism is a Bloom filter, which may be used to test whether a particular element is within a set of data and, in some embodiment, may be used to test whether or not an address is within a set of addresses. Notably, a Bloom filter or other high recall lookup array used herein may return an indication that a searched address is definitely not in a set of addresses or is possibly in the set. Thus, such a lookup may allow for false positives, but not false negatives.

According to various embodiments, a router may use a Bloom filter or other high recall lookup array, to determine which actions to take, if any, after an ND cache miss. As noted above, a router may throttle the punting of packets and the performance of ND resolution or other address resolution, in cases of an ND cache miss. In some embodiments, the router may use a Bloom filter or other high recall lookup mechanism to significantly limit the amount of attack packets that are punted, while still allowing legitimate packets to be processed.

Figure 3A:
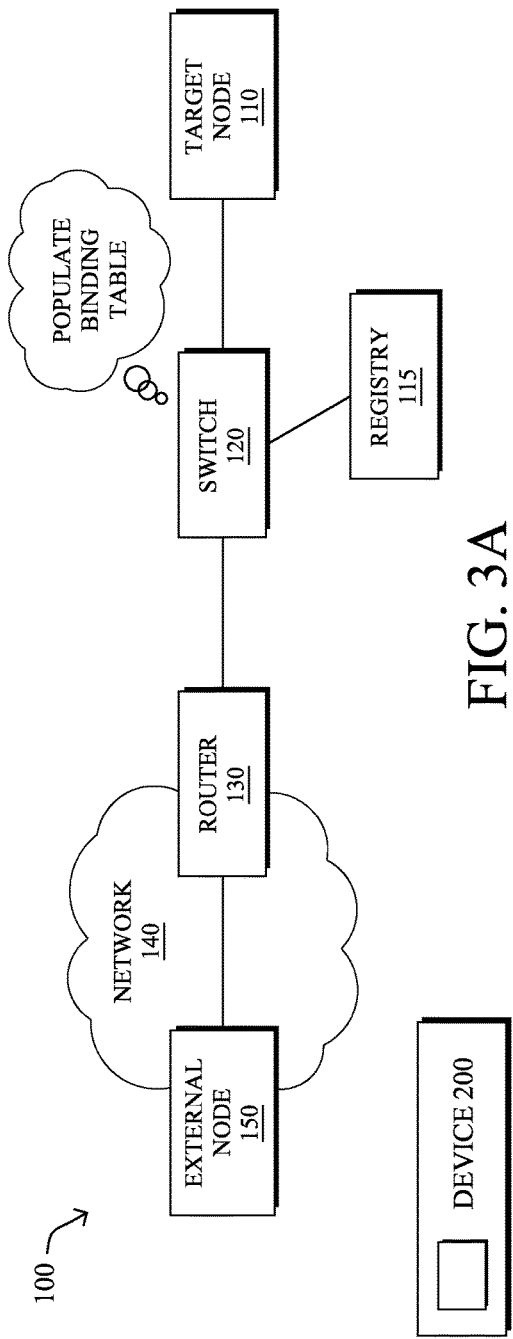
Figure 3B:
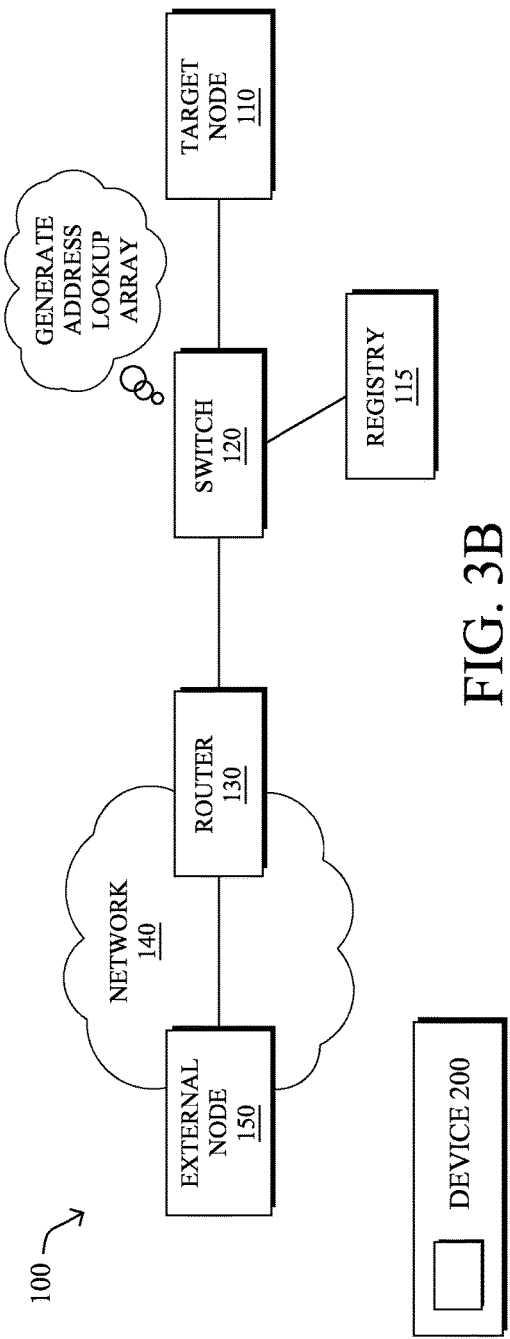

FIGS. 3A-3C illustrate an example of an address lookup array being generated, according to various embodiments. As shown in FIG. 3A, switch 120 may populate its binding table (e.g., binding table 247) with any number of entries. For example, such a binding table may include any or all of the following:

TABLE 1

| IP Address | MAC address | Port |
| --- | --- | --- |
| $IP_1$ | $MAC_{H1}$ | P1 |
| $IP_2$ | $MAC_{H2}$ | P2 |
| $IP_3$ | $MAC_{H3}$ | P3 |
| ... | ... | ... |
| $IP_n$ | $MAC_{Hn}$ | $P_n$ |

As shown above, switch 120 may install binding table entries for node 110 (e.g., a first host device H1) and for any number of other nodes/devices connected to switch 120 (e.g., a second host device H2, a third host device H3, an nth host device Hn, etc.). Each binding table entry may, for example, map the IP address and MAC address of the host device to a port of switch 120.

According to various embodiments, a switch or other network device may use its binding table entries to generate an address lookup array, such as a Bloom filter. For example, as shown in FIG. 3B, switch 120 may generate a Bloom filter $B=f(IP_1, \ldots IP_n)$, based on the illustrative binding table entries shown above in Table 1. In some embodiments, a mask to be applied on packets may be associated to a Bloom filter array or other high recall lookup array generated by switch 120, to extract the destination address of a given packet. In another embodiment, a portion of the mask can indicate a transport, and apply to the ports or to the application content.

One or more hash functions may also be associated with the lookup array and may be used to populate each bit of the array, in some embodiments. For example, switch 120 and/or any of the other network devices that know about the addresses present in the network may build corresponding hash functions for their corresponding lookup arrays. In other words, in one embodiment, each switch in the network may build the hashes for all of the addresses on its access ports and generate its own Bloom filter or other lookup array as a bitmap that has all the bits set for all of the addresses and hashes. The hashes can be, for instance, cyclic redundancy checks (CRCs), so as to improve the efficiency of the hash function by a hardware fast path.

Each switch that generates an address lookup array from its known addresses may provide the array to a network router. For example, as shown in FIG. 3C, switch 120 may provide a Bloom filter 302 to router 130 that was generated by switch 120 using its binding table entries. In one embodiment, router 130 may combine the lookup arrays (e.g., bitmaps) that it receives from the various switches or other devices in the network (e.g., registry 115) by performing logical AND operations on the arrays. In another embodiment, router 130 may maintain each address lookup array separately, which is more costly but yields less false positives. In either case, the collection of lookup arrays may be passed by the switches or other devices in the network to the one or more routers in the network.

Figure 4B:
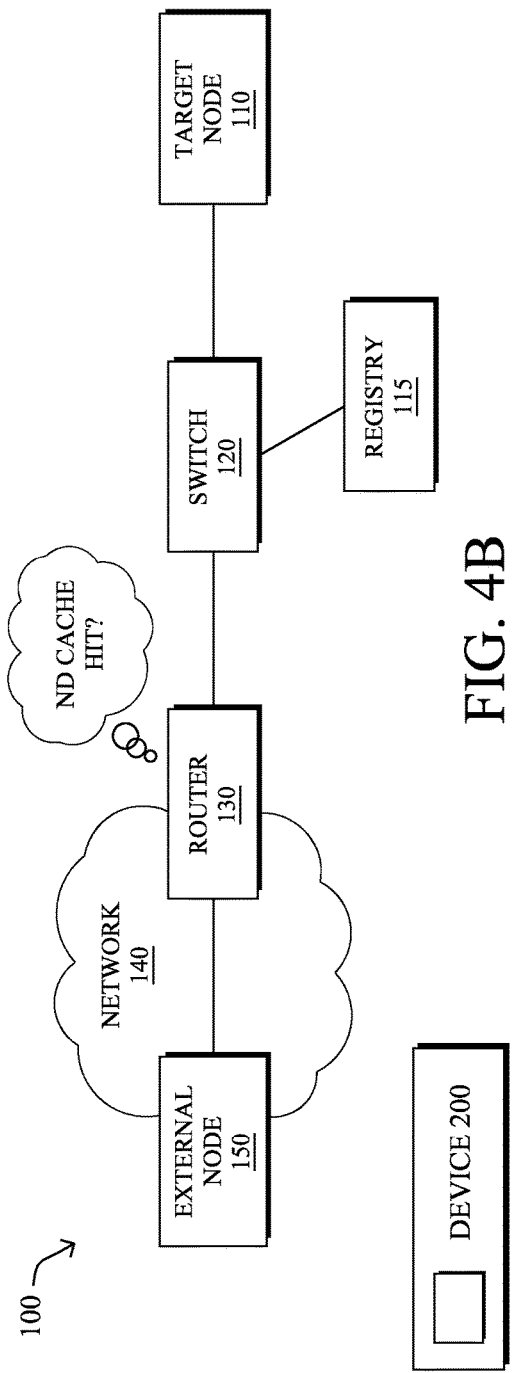
Figure 4C:
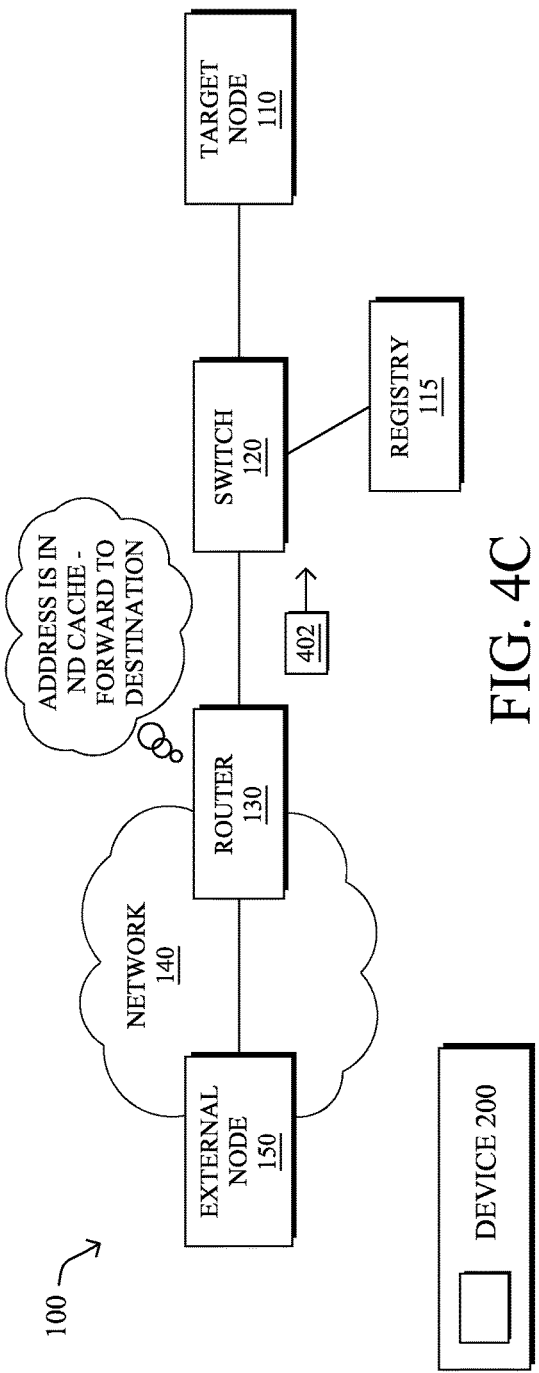
Figure 4D:
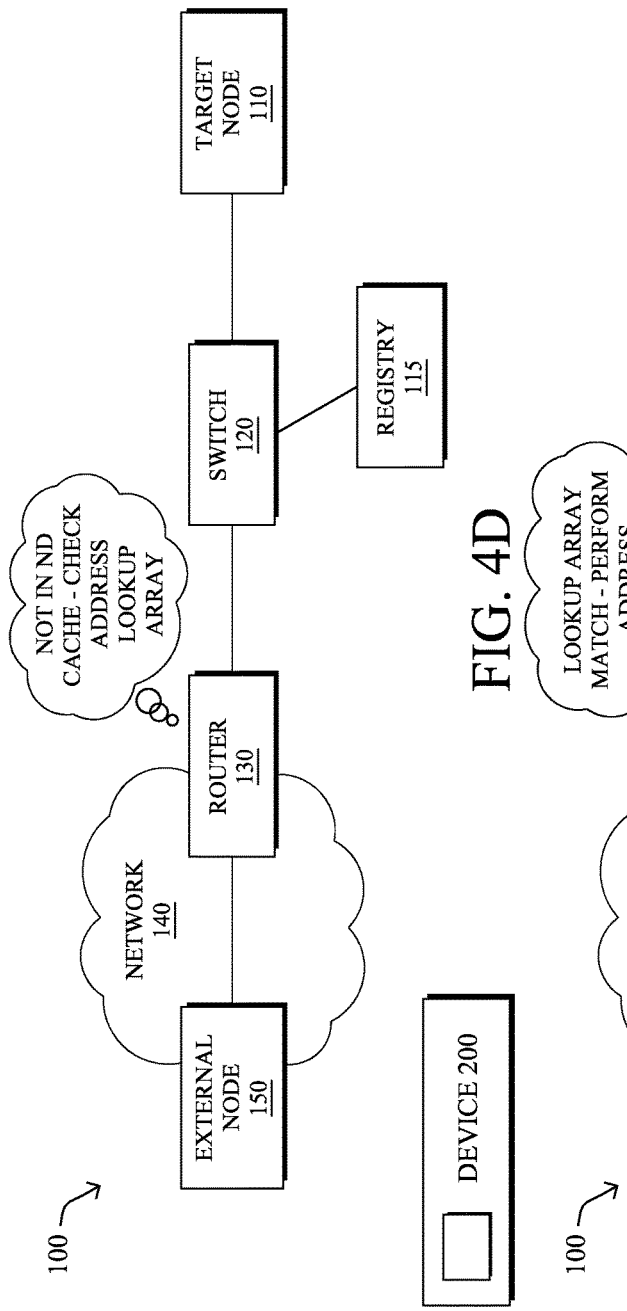

Referring now to FIGS. 4A-4F, an example of a device processing a received packet is shown, in accordance with the embodiments herein. As shown in FIG. 4A, assume that router 130 receives a packet 402 from node 150 that is addressed to a particular address in the subnet (e.g., address $IP_j$). In response, router 130 may first determine whether the destination address of packet 402 is within its local ND cache. If so, router 130 may forward packet 402 normally using the matched address in its ND cache, as shown in FIG. 4C. However, if the destination address of packet 402 is not found in the ND cache of router 130, router 130 may compute the appropriate hashes and check to see if the corresponding bits are set in its local address lookup array(s), as shown in FIG. 4D. In some embodiments, router 130 may maintain individual lookup arrays for each sending device (e.g., switch 120, etc.), so that they can be updated by the sending devices (e.g., when addresses are added or removed in the network). If router 130 maintains multiple bitmaps, it may search each of the installed bitmaps/lookup arrays, to determine whether all of the bits for all of the hash functions on the destination address are set in a particular bitmap. In another embodiment, router 130 may aggregate the lookup arrays into a master lookup array (e.g., by performing a logical AND operation on the bitmaps), and use this array when processing incoming packets.

Figure 4E:
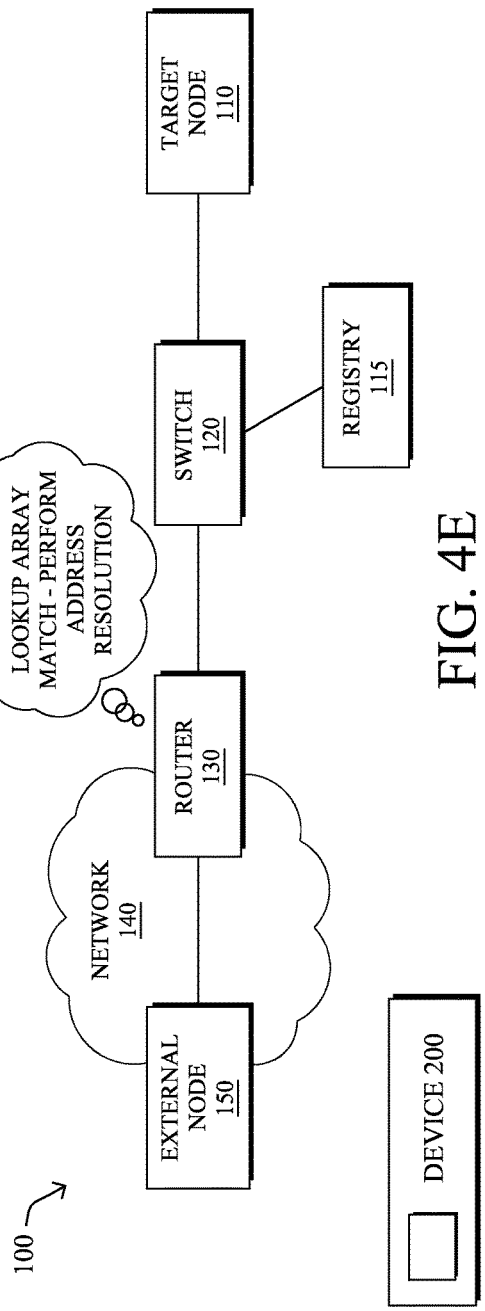

As noted above, a lookup mechanism that has high recall may be used to definitively say whether an address is definitely not in the set of addresses used to generate a lookup array or possibly in the set of addresses. For example, if all of the bits for all of the hash functions computed by router 130 from the destination address of packet 402 are set in its local lookup array, this may indicate that address $IP_j$ is possibly a known address in the network. In such a case, as shown in FIG. 4E, router 130 may perform address resolution for address $IP_j$. For example, router 130 may punt packet 402 to a slower switching path and send an NS message into the network (e.g., to switch 120, etc.). In response, router 130 may receive a neighbor advertisement message that indicates the MAC address (e.g., $MAC_{H,j}$) associated with address $IP_j$, and use this information to update its ND cache. Router 130 may then forward any subsequently received packets that are addressed to $IP_j$, since the appropriate entry now exists in its ND cache.

Figure 4F:
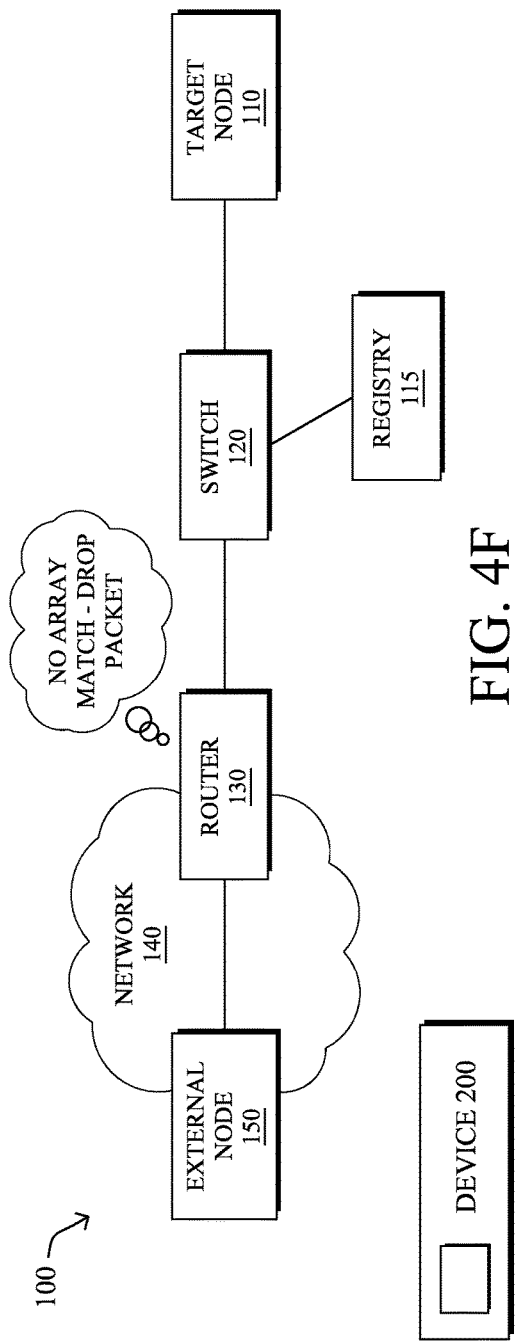

If address lookup using the lookup array(s) results in no matches, router 130 may definitively know that destination address $IP_j$ is not known to the devices in the network (or at least was not in the set of addresses used to generate the lookup arrays). In other words, if, for each of the one or more bitmaps/lookup arrays maintained by router 130, there is at least one bit that is not set from the hash functions, then the fast path of router 130 may process the destination address $IP_j$ if the address does not exist in the network. In such a case, router 130 may take any number of mitigation actions with respect to packet 402. For example, as shown in FIG. 4F, router 130 may drop packet 402 and/or initiate other mitigation actions (e.g., reporting the attack, logging the attack, etc.).

As would be appreciated, the lookup mechanism described above may still allow for false positives to cause the punting of packets and the triggering of address resolution. However, the number of attack packets that make it through will be greatly reduced, while still allowing for the forwarding of legitimate packets that result in an ND cache miss. For example, assume that the binding table of switch 120 has 10,000 entries. To filter 99% of unknown destinations (e.g., the false positive probability is 1%), a Bloom filter of 90 kilobits and six hash functions may be generated by switch 120. Such a lookup may effectively reduce an ND-based DoS attack by a factor of 100. To reduce the amount of attack traffic even further, larger Bloom filters and more hash functions may be used. For example, a Bloom filter of 290 kilobits and twenty hash functions may be able to filter out 99.9999% of all attack packets. In other words, the size of the lookup array and number of its corresponding hash functions may be selected as desired based on a tradeoff between the acceptable amount of attack traffic that may still make it past router 130 and the amount of resources consumed by the lookup mechanism. Notably, simply providing the contents of the binding table to the router may be impractical in many cases and the generated lookup array/hash functions may be significantly smaller in size than the set of binding table entries themselves.

To prevent against an extremely violent attack, router 130 may be configured to still throttle overloaded packets that result in ND cache misses. In doing so, any legitimate packets in the set may be dropped as well. However, by using a Bloom filter or other lookup array mechanism, the ratio of legitimate to malicious packets that are dropped may be reduced dramatically. In some embodiments, in response to a surge in the number of ND cache misses, the devices in network 100 may be configured to augment the size of the Bloom filter(s) or other lookup arrays used (e.g., the number of bits in the bitmaps), to reduce the probability of false positives. In various embodiments, compression techniques may also be used to reduce the size of any lookup arrays and/or array updates (e.g., when long strings of zeros exist, etc.).

Figure 5A:
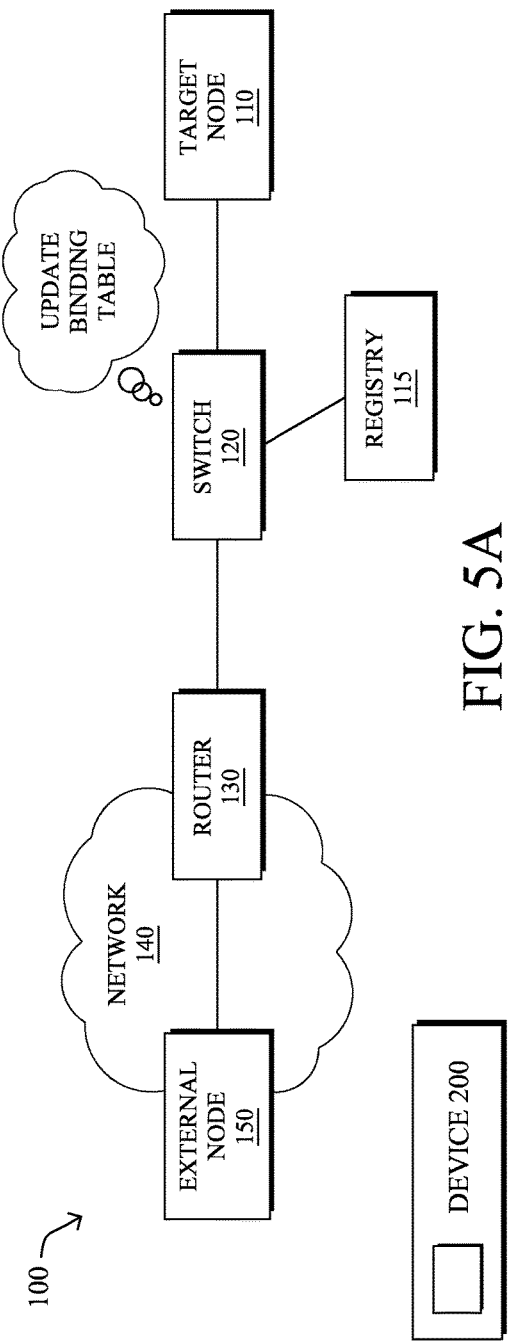
FIGS. 5A-5D illustrate an example of an address lookup array being updated.

FIGS. 5A-5D illustrate an example of an address lookup array being updated, according to various embodiments. In another aspect of the teachings herein, information may be exchanged between the switch, which maintains a table of all known addresses, and the router, which runs packets that result in ND cache misses through the corresponding address lookup array(s). As shown in FIG. 5A, assume that switch 120 discovers a new IPv6 address for a host $H_{n+1}$ and updates its binding table, accordingly (e.g., to add an entry for the corresponding IP address $IP_{n+1}$, MAC address $MAC_{Hn+1}$, and port $P_{n+1}$). In such a case, switch 120 may initiate the updating of the corresponding address lookup array hosted by router 130 in a number of ways.

Figure 5B:
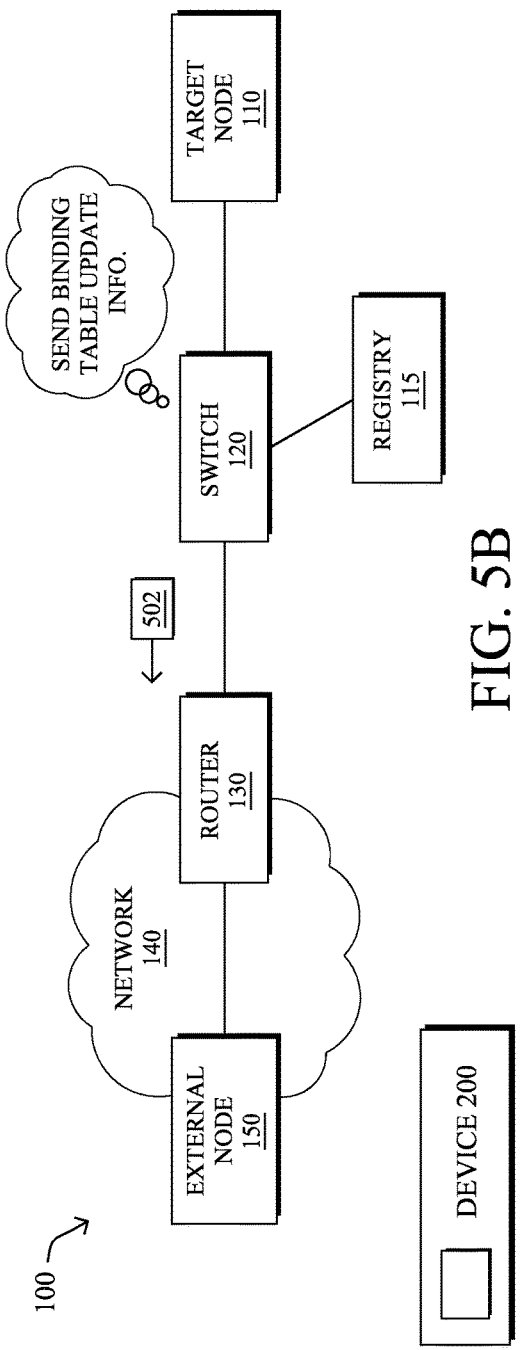

In one embodiment, switch 120 may provide binding table entry 502 to router 130 that includes the IP and MAC addresses for the binding table update, leaving router 130 to update its own lookup array, as shown in FIG. 5B. In turn, router 130 may use the address information to calculate its updated address lookup array (e.g., by calculating a Bloom filter, etc.). However, doing so may be comparatively expensive since IPv6 addresses are large.

Figure 5C:
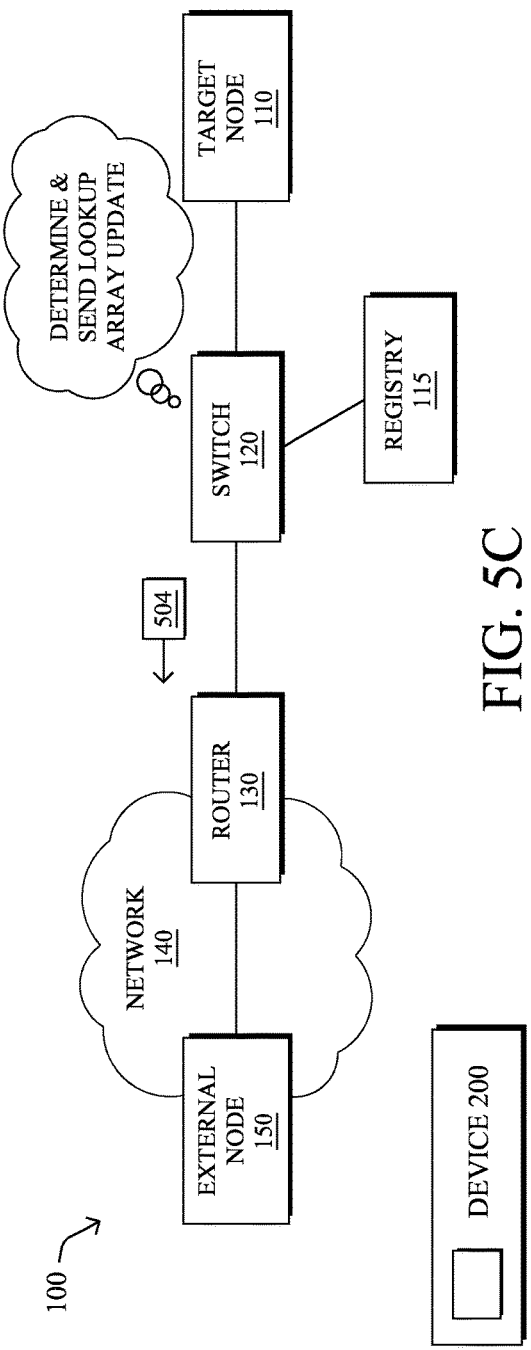
Figure 5D:
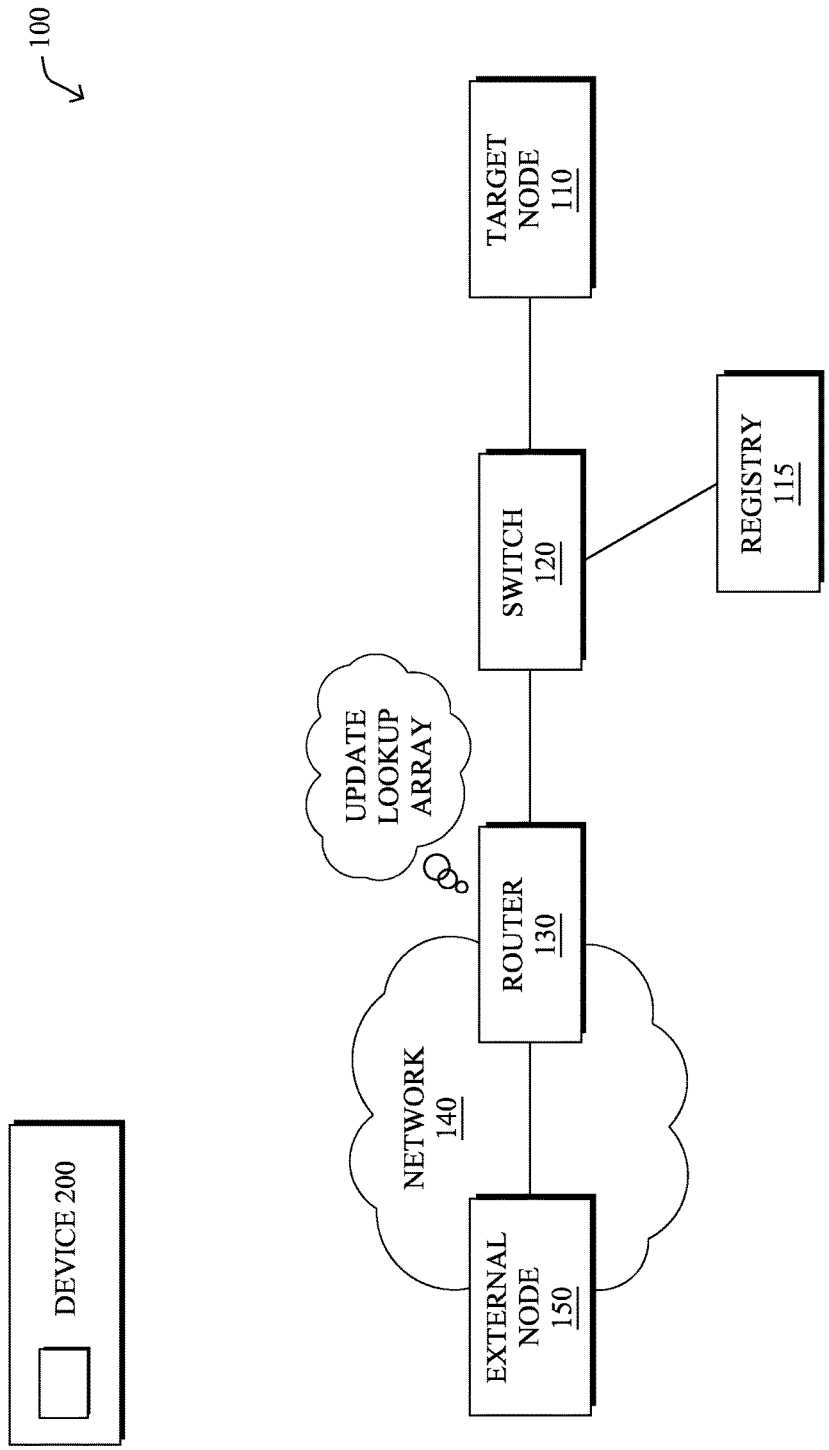

In another embodiment, as shown in FIG. 5C, switch 120 may compute the updated lookup array itself based on its updated binding table and provide the lookup array update 504 to router 130. Notably, recomputing the entire lookup array may be rather large (e.g., 80K-200K, depending on the false positive probability goal), making update 504 preferable to sending a full lookup array to router 130. Router 130 may then use update 504 to update the one or more lookup arrays that router 130 uses to mitigate DoS attacks, as shown in FIG. 5D.

In some cases, switch 120 may determine whether or not to send the address itself or a lookup array update to router 130, based on the size of the resulting update. For example, switch 120 may run K-number of hash functions on the newly discovered address, $IP_{n+1}$ to get K'<K number of bits to set (out of M-number of bits) and encode the corresponding K'-number of bit positions in an M-bit size Bloom filter/bitmap that may be sent to router 130 as an update. To achieve a false positive probability of 0.000001, thereby filtering 99.9999% of attacks, the filter must be 290 kilobits in size with twenty associated hash functions. On average, this leads to K/2=10 bits that will need to be set. Similarly, the position of each bit to set can be encoded on approximately 19 bits, leading to an update size of 19*10=190 bits. In such a case, switch 120 may opt to send just the new IP address to router 130, since it would be smaller than the array update (e.g., 128 bits vs. 190 bits). However, if a false positive rate of 1% is acceptable, only a Bloom filter of size 90 kilobits and six hash functions may be needed. On average, this means that only 3 bits will need to be set and their bit positions can be encoded on approximately 16 bits. In this case, switch 120 may instead send the array update since the size of the update will typically only be approximately 16*3=48 bits, which is significantly smaller than the size of the IP address itself (e.g., 128 bits).

To account for an address being removed, switch 120 may periodically regenerate its address lookup array or at any other time (e.g., at random times, in response to a command, at time when use of the network is expected to be minimal, etc.). Switch 120 may then provide the updated array to router 130, which may merge the updated lookup array from switch 120 into its master address lookup array (e.g., by updating the bits of its master array based on the updated array from switch 120).

Figure 6:
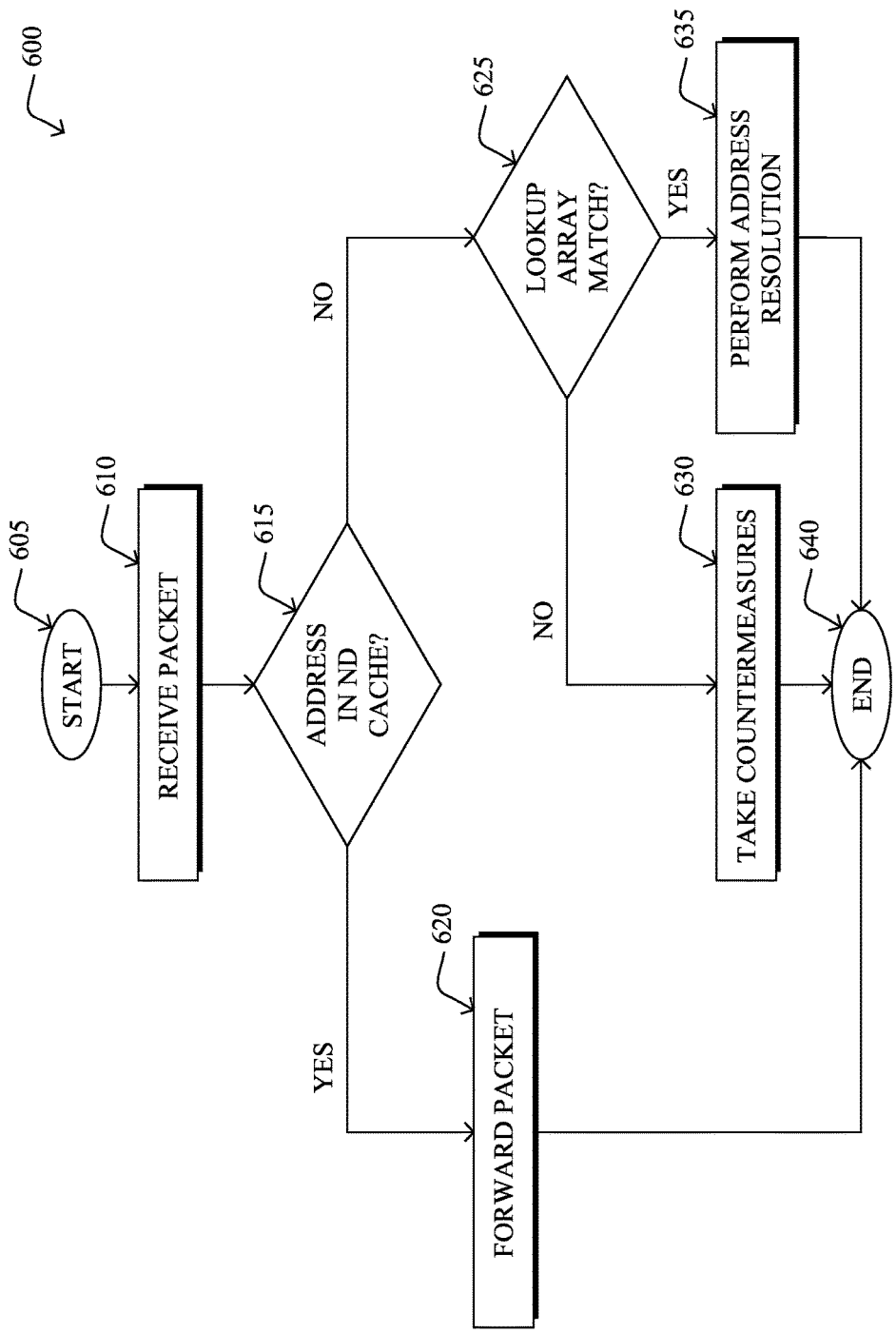
FIG. 6 illustrates an example simplified procedure for processing a packet in a network.

FIG. 6 illustrates an example simplified procedure for processing a packet in a network, according to various embodiments. In general, procedure 600 may be performed by a network device (e.g., device 200), such as a router or other device configured to forward packets in a data network. Procedure 600 may begin at step 605 and continue on to step 610 where, as described in greater detail above, the device receives a packet that indicates a particular network address. For example, the device may receive a packet for forwarding that indicates a particular IPv6 address.

At step 615, the device may make a determination as to whether or not the address indicated by the packet is in the ND cache of the device, as detailed above. In various cases, such an ND cache may map L3 and L2 addresses of a node known to the network device. For example, an ND cache entry may map an IP address to a MAC address. If the device determines that the packet's address is not in the ND cache, procedure 600 may continue on to step 620. However, if the device determines that the packets address is not in the ND cache, procedure 600 may continue on to step 625.

At step 620, as described above, the device may forward the received packet, in response to determining that the packet's address is in the ND cache of the device. For example, the device may strip the L3 address from the packet, add the corresponding L2 address from the found ND cache entry to the packet, and forward the packet accordingly. Procedure 600 then ends at step 640.

At step 625, if the packet's address is not in the ND cache, the device may determine whether or not the address has a match in one or more address lookup arrays, as described in greater detail above. In other words, the device may determine whether the destination address of the packet is not in any of the sets of addresses used to generate the one or more address lookup arrays or is possibly in the set of addresses used to generate at least one of the arrays. In various embodiments, such an array may be generated and sent to the device by one or more switches or other nodes in the network that have information regarding all of the nodes in the network. For example, a particular switch in the network may generate a Bloom filter from its binding table entries and provide the filter (e.g., as a bitmap) and any corresponding hashes to the device. During lookup, the device may then hash the destination address of the incoming packet and compare the resulting bits to that of the lookup array, to determine whether or not there is a match. The device may maintain separate lookup arrays received from the different switches/nodes and/or combine the received arrays (e.g., using a logical AND operation on the received bitmaps). In turn, the device may hash the address of the received packet and compare the resulting bits to the one or more lookup arrays maintained by the device.

In some embodiments, the one or more address lookup arrays maintained by the network device may be part of a lookup mechanism that has high recall, but still allows for a certain percentage of false positives. For example, in the case of a Bloom filter, the recall may be 100% (e.g., the filter can definitively determine that an address is not in the set of known addresses) with a false positive rate of <100% (e.g., the filter cannot definitively determine that the address is in the set of known addresses). If the results are negative (e.g., the address of the packets was definitely not used to generate any of the address lookup arrays), procedure 600 may continue on to step 630. However, if the device determines that the destination address of the packet is possibly in the set of known addresses used to generate at least one of the lookup arrays, procedure 600 may continue on to step 635.

At step 630, the device may take one or more countermeasures, as detailed above. If the results of the lookup in the address lookup array are negative and the lookup mechanism has a high recall (ideally 100%), then the device may treat the packet as though the destination address of the packet is not a known address in the network. In such a case, the device may determine that the packet is part of a DoS attack and take any number of countermeasures. In one embodiment, the device may drop the packet and prevent any modification of its ND cache with the address of the packet. In further embodiments, the device may generate an alert, log details regarding the packet, or take other measures, to help identify the attacker. Procedure 600 then ends at step 640. In some embodiments, procedure 600 may only proceed to step 630 if the number or rate of ND cache misses (as determined in step 615) exceeds a threshold amount. In other words, the device may allow a packet with an unknown destination address to trigger address resolution, so long as the number or rate of packets that trigger this functionality does not indicate a potential attack. For example, there may still be the possibility that the destination address is a legitimate address, but this is not reflected in the lookup array(s) (e.g., the address is unknown to the nodes in the network but is a legitimate address, the lookup arrays have not been updated yet, etc.).

At step 635, as described in greater detail above, the device may perform address resolution for the address of the packet. In particular, since there is still a possibility that the packet is a legitimate packet, the device may send an NS message into the network. In response, a node (e.g., a switch) that has a binding table entry from the address may provide the requisite L2 address to the device as part of a neighbor advertisement message. The device may then use this message to add the corresponding entry into its ND cache, thereby allowing direct forwarding of subsequent packets addressed to the same address. While there is still the possibility that the packet was indeed malicious, the number of attack packets that trigger an address resolution response may be reduced considerably through the use of a high recall lookup mechanism that still allows for false positives. In one embodiment, the device may throttle the punting of packets for purposes of address resolution, such as when a large influx of packets is received by the device that result in ND cache misses. Procedure 600 then ends at step 640.

Figure 7:
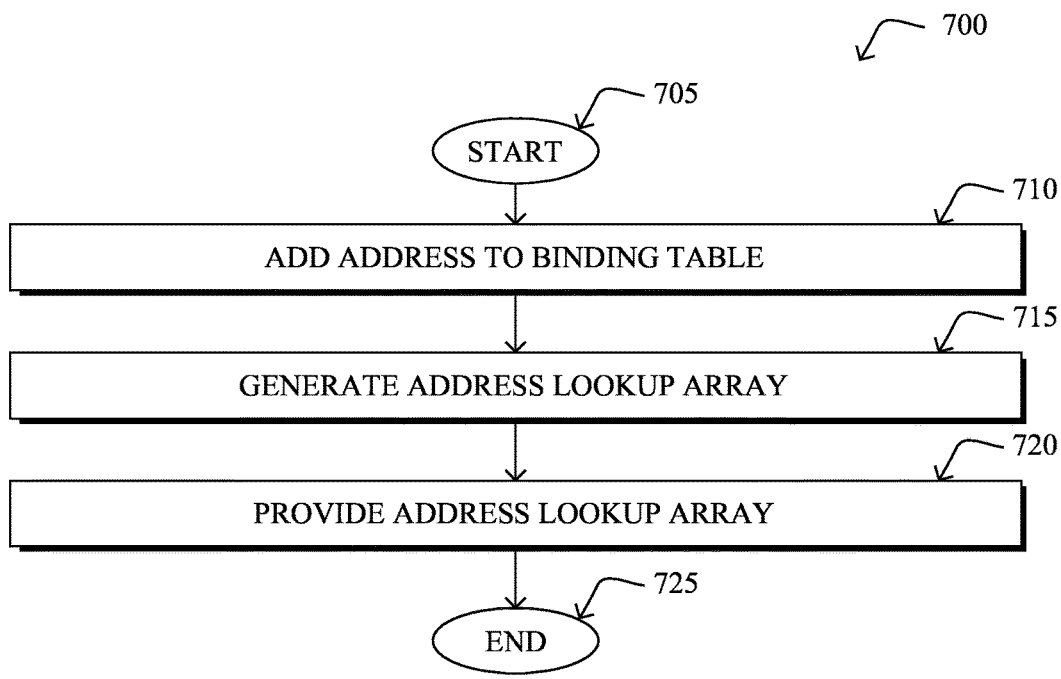
FIG. 7 illustrates an example simplified procedure for generating and providing an address lookup array.

FIG. 7 illustrates an example simplified procedure for generating and providing an address lookup array, according to various embodiments. Procedure 700 may be performed by a network device (e.g., device 200) such as, e.g., a switch or other network device that maintains a binding table. Procedure 700 may begin at step 705 and continue on to step 710 where, as described in greater detail above, the device may add an address to its binding table. For example, a network switch may add a new entry to its binding table for a newly discovered network address. Such an entry may include, e.g., a newly discovered IP address, a corresponding MAC address, and/or a corresponding port of the switch.

At step 715, as detailed above, the device generates an address lookup array based on the address added to the binding table. In some embodiments, the lookup array may be a Bloom filter array (e.g., a bitmap) having any number of associated hash function and a high amount of recall. Notably, a Bloom filter has a high amount of recall (e.g., exactly 100%), such that a failed lookup in the array guarantees that the looked up address was not used to construct the array. For example, a switch or other network device that maintains a binding table may generate a lookup array based on the IPv6 addresses in its binding table. The number of hash functions and the size of the lookup array may be selected as desired, to afford a certain degree of precision during a lookup.

In various embodiments, the lookup array may be a lookup array for all of the addresses in the binding table of the device or a lookup array update. For example, once the device has generated a lookup array for its full binding table, the device may generate an update for this array based on any new addresses added to the binding table since the device generated the original lookup array. In such a case, the device may run the hash functions used to generate the original lookup array on the newly added address or addresses and then encode the resulting bit positions of the original lookup array.

At step 720, the device may provide the generated address lookup array to one or more other devices in the network (e.g., a router, etc.), as described in greater detail above. In particular, the device may provide the lookup array for its full binding table, a lookup array update for any newly added addresses to its binding table, any hash functions and/or associated with the lookup array, to the other device or devices. As would be appreciated, the lookup array and/or lookup array update may be considerably smaller in size than their underlying IPv6 addresses, making it practical to send information regarding all network addresses to the router or other devices. In turn, the other device or devices may use the lookup array, lookup array update, and/or hash functions, to determine whether or not an address specified in a packet to be forwarded is definitely not in the network or possibly in the network. In some cases, the other device(s) may merge the lookup array or lookup array update with one or more other existing lookup arrays at the device. In other embodiments, the other device(s) may maintain separate lookup arrays. In a further embodiment, the device may decide whether to send a lookup table update or simply the IPv6 address(es) to the one or more other devices (e.g., whichever is smaller), to allow the other device(s) to perform the update instead. Procedure 700 then ends at step 725.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provides a validation mechanism that may be used on a faster switching path (e.g., a hardware-based path), to validate that an address does not exist in the subnet before punting the packet to software for address resolution (e.g., IPv6 ND, ARP, etc.). This effectively makes it so that in case of an ND cache DoS attack, most of the attack packets are filtered out in the faster path while none of the legitimate packets are. Thus, most of the packets that are punted for address resolution are for destinations that effectively exist in the subnet (e.g., /64, etc.), making the ND processing worthwhile. In addition, the techniques herein effective mitigate a DoS attack with: 1.) no effect on addresses that are effectively present on the network, and 2.) a much lower CPU use for the ND neighbor cache and the binding table lookup. In addition, the techniques herein require minimal state and allow for incremental modification of the lookup arrays, to incrementally add addresses. Further, the techniques herein may be optimized for hardware operation, such as by using CRC-based hashes. Finally, the techniques herein allow for incremental updates that minimize the amount of information exchanged between, e.g., a switch that discovers addresses, and, e.g., a router that filters packets for unwanted destinations.

While there have been shown and described illustrative embodiments that protect the ARP/ND cache against DoS attacks in a computer network, it is to be understood that various other adaptations and modifications may be made within the spirit and scope of the embodiments herein. For example, the embodiments have been shown and described herein with relation to a first hop security model. However, the embodiments in their broader sense are not as limited, and may, in fact, be used with other suitable models and/or appropriate standards, including, but not limited to, future versions of the Internet Protocol that utilize similar NS/ND techniques as in IPv6. For instance, the messages used need not be limited to IPv6 ND lookups. In addition, the techniques may also be applied to any node in a very large layer-2 domain to resolve the IPv6/MAC addresses for their peers without sending multicast (e.g., checking a Binding Table or registry in a similar manner).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    adding, by a first device in a network, an address to a binding table of the first device;
    generating, by the first device, a Bloom Filter based in part on the address added to the binding table;
    providing, by the first device, the Bloom Filter to a second device in the network, wherein the second device is operable to use the Bloom Filter to determine whether a destination address of a packet received by the second device is in a set of addresses used to generate the Bloom filter, based on determining that the destination address of the packet is not within a neighbor discovery (ND) cache of the device,
    wherein the second device performs address resolution for the destination address of the packet, based on determining that the destination address of the packet is possibly in the set of addresses used to generate the Bloom filter; or drops the packet, based on determining that the destination address is not in the set of addresses used to generate the Bloom filter,
    identifying, by the first device, a new address in the network;

adding, by the first device, the new address to the binding table of the first device;
generating, by the first device, an update for the Bloom Filter based on the new address, wherein the update for the Bloom Filter is smaller in size than the new address; and
providing, by the first device, the update for the Bloom Filter to the second device.

2. An apparatus, comprising:
one or more network interfaces to communicate within a computer network;
a processor coupled to the network interfaces and configured to execute one or more processes; and
a memory configured to store a process executable by the processor, the process when executed operable to:
add an address to a binding table stored in the memory;
generate a Bloom Filter based in part on the address added to the binding table;
provide the Bloom Filter to a device in the network, wherein the device is operable to use the Bloom Filter to determine whether a destination address of a packet received by the device is in a set of addresses used to generate the Bloom filter, based on determining that the destination address of the packet is not within a neighbor discovery (ND) cache of the device,
wherein the second device performs address resolution for the destination address of the packet, based on determining that the destination address of the packet is possibly in the set of addresses used to generate the Bloom filter; or drops the packet, based on determining that the destination address is not in the set of addresses used to generate the Bloom filter;
identify a new address in the network;
add the new address to the binding table;
generate an update for the Bloom Filter based on the new address, wherein the update for the Bloom Filter is smaller in size than the new address; and
provide the update for the Bloom Filter to the device.

3. A tangible non-transitory computer readable medium storing program instructions that cause a computer to execute a process, the process comprising:
add an address to a binding table stored in the memory;
generate a Bloom Filter based in part on the address added to the binding table;
provide the Bloom Filter to a device in the network, wherein the device is operable to use the Bloom Filter to determine whether a destination address of a packet received by the device is in a set of addresses used to generate the Bloom filter, based on determining that the destination address of the packet is not within a neighbor discovery (ND) cache of the device,
wherein the second device performs address resolution for the destination address of the packet, based on determining that the destination address of the packet is possibly in the set of addresses used to generate the Bloom filter; or drops the packet, based on determining that the destination address is not in the set of addresses used to generate the Bloom filter,
identify a new address in the network;
add the new address to the binding table;
generate an update for the Bloom Filter based on the new address, wherein the update for the Bloom Filter is smaller in size than the new address; and
provide the update for the Bloom Filter to the device.

* * * * *

UNITED STATES PATENT AND TRADEMARK OFFICE
CERTIFICATE OF CORRECTION

PATENT NO. : 10,382,397 B2
APPLICATION NO. : 15/654070
DATED : August 13, 2019
INVENTOR(S) : Pascal Thubert Page 1 of 1

It is certified that error appears in the above-identified patent and that said Letters Patent is hereby corrected as shown below:

In the Specification

Column 9, Lines 27, please amend as shown:
address $IP_j$ as if the address does not exist in the network. In Signed and Sealed this
Seventeenth Day of March, 2020

Andrei Iancu
*Director of the United States Patent and Trademark Office*